United States Patent [19]

Kojima et al.

[11] Patent Number: 4,686,434
[45] Date of Patent: Aug. 11, 1987

[54] ELECTRIC VEHICLE MONITORING SYSTEM

[75] Inventors: Shigeru Kojima; Hideo Obi, both of Hyogo, Japan

[73] Assignee: Mitsubishi Denki Kabushiki Kaisha, Tokyo, Japan

[21] Appl. No.: 837,240

[22] Filed: Mar. 7, 1986

[30] Foreign Application Priority Data

Mar. 14, 1985 [JP] Japan .................................. 60-50953
May 14, 1985 [JP] Japan ............................... 60-100545

[51] Int. Cl.$^4$ ............................................. B61C 15/08
[52] U.S. Cl. ...................................... 318/52; 318/71; 318/77; 318/112; 364/426
[58] Field of Search ...................... 318/52, 383, 5, 59, 318/71, 77, 78, 85, 112, 723, 807; 180/197; 303/20, 91, 94, 95, 100; 361/238; 364/426

[56] References Cited

U.S. PATENT DOCUMENTS 3,663,875  5/1972  Ashiya ................................. 318/52
4,298,940 11/1981  Tadokoro et al. ................. 318/52 X
4,344,139  8/1982  Miller et al. ..................... 361/238 X
4,392,091  7/1983  Roberts et al. ..................... 318/52
4,465,142  8/1984  Lely et al. ....................... 364/426 X

FOREIGN PATENT DOCUMENTS 0961955  1/1975  Canada ................................. 318/52
0085394  8/1983  European Pat. off. .

Primary Examiner—William M. Shoop, Jr.
Assistant Examiner—Bentsu Ro
Attorney, Agent, or Firm—Sughrue, Mion, Zinn, Macpeak & Seas

[57] ABSTRACT

An electric vehicle monitoring system in which one induction motor has a rotational speed detector but another motor does not have such a detector. Separate current detectors monitor the current delivered to each of the motors. A calculations circuit uses the rotation of the one motor and a comparison of the two currents to monitor the performance of both motors.

6 Claims, 8 Drawing Figures

FIG. 4
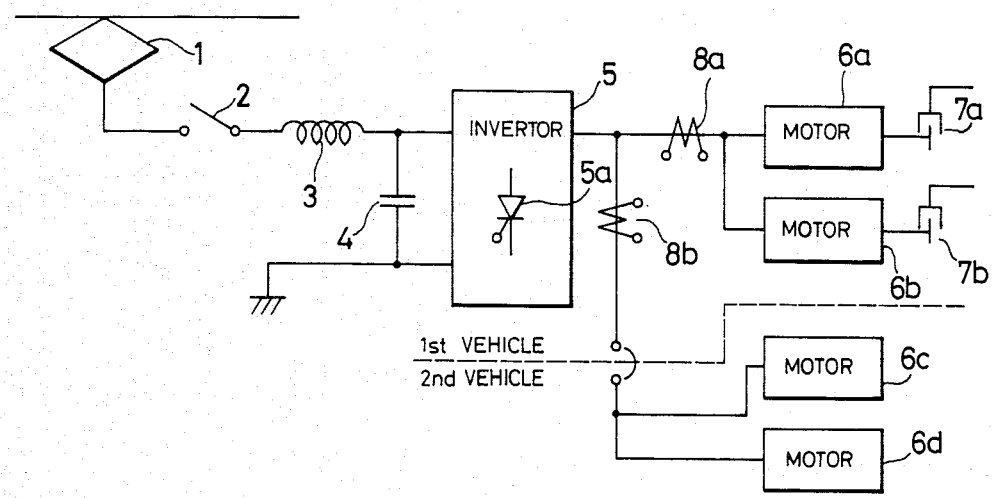
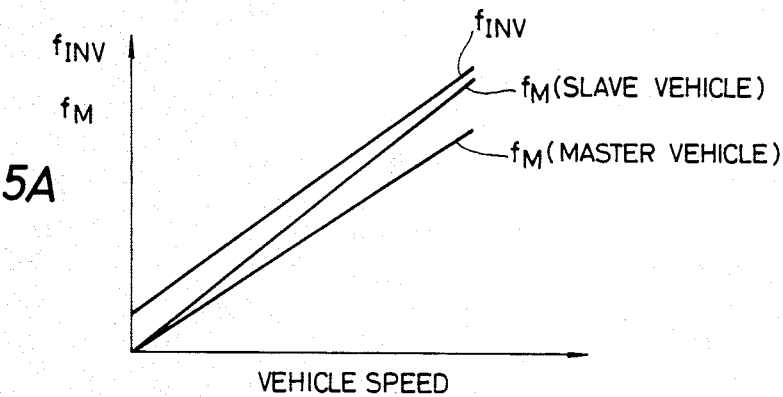
FIG. 5A
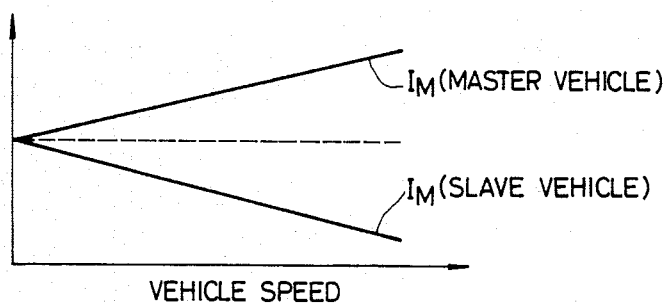
FIG. 5B

ELECTRIC VEHICLE MONITORING SYSTEM

BACKGROUND OF THE INVENTION

This invention relates to a system for protecting an electric vehicle which is driven by controlling the vehicle driving induction motor with a variable voltage/variable frequency inverter.

FIG. 1 shows one example of the main circuit of an electric vehicle whose induction motor is driven by an inverter.

The vehicle includes a pantograph 1 receiving electrical power for the vehicle. The power is switched by a switch 2 and is filtered by a filter reactor 3 and a filter capacitor 4. The filtered power is inverted by an inverter 5 that includes a thyristor 5a, particularly a gate turn-on thyristor, the inverted power is delivered to an induction motor 6 to which is attached a speed detector 7. The speed detector is optional.

The operation of the circuit shown in FIG. 1 will be described. In the electric vehicle as described above, the torque T provided by the induction motor 6 can be approximately represented by the following expression (1):

$$T = k \times \left(\frac{V}{f_{INV}}\right)^2 \times \frac{F_S}{R_2} \quad (1)$$

where V is the inverter output voltage, $f_{INV}$ is the inverter frequency, $f_S$ is the slip frequency, $R_2$ is the motor secondary resistance, and k is a proportionality constant.

As is clear from equation (1), if $V/f_{INV}$ is maintained constant, then the torque T changes only with the slip frequency $f_S$. In the power running operation, the inverter frequency $f_{INV}$ can be expressed as the sum of two frequencies.

$$f_{INV} = f_M + f_S \quad (2)$$

where $f_M$ is the motor rotational frequency, On the other hand, in the electric braking operation, the inverter frequency $f_{INV}$ is given by $$f_{INV} = f_M - f_S \quad (3)$$

The inverter frequency $f_{INV}$ is determined as described above. As a result, the value $V/f_{INV}$ is made constant by adjusting the motor voltage V, and the slip frequency $f_S$ is controlled, so that the produced torque T has a predetermined value.

A problem arises because of the motor secondary resistance $R_2$ changes with temperature. In order to overcome this problem and obtain a predetermined torque, the thermal change of the motor secondary resistance $R_2$ is compensated and the variation of $(f_S/R_2)$ in equation (1) is prevented by correcting the slip frequency $f_S$ so that $(f_S/R_2)$ and consequently the motor current remain constant and a predetermined torque T is obtained. This has been described in detail, for instance, in the specification of Japanese Patent Application No. 181687/1983.

FIG. 2 is a diagram outlining the arrangement of a conventional electric vehicle control system of this type, adapted to drive a plurality of parallel-connected induction motors. As shown in FIG. 2, speed or rotational frequency detectors 7a and 7b are provided for the output shafts of induction motors 6a and 6b, respectively. In FIG. 2, a current detector 8 detects the current supplied to the two motors 6a and 6b and may be a current transformer. The elements 1 through 5 designate the same elements as those in FIG. 1. In the case of FIG. 2, a system is employed in which only the current instruction value is controlled as a value corresponding to the number of induction motors. The system is employed as a general drive system for controlling an electric vehicle. The term "current instruction value" is intended to mean the control target value for an induction motor which is determined according to predetermined data such as, for instance, the load of the electric vehicle to be controlled. The current instruction value is unequivocally determined from the torque value, the motor characteristic and other parameters which are required to obtain a predetermined speed control characteristic for the electric vehicle.

However, two problems arise with the described system. First, the induction motors are different in motor rotational frequency from one another because the wheels associated with the induction motors are likely to be somewhat different in diameter from one another. Accordingly, speed detectors are provided for all the motors and are selectively used for control. That is, in the power running operation, first the inverter frequency $f_{INV}$ is determined by adding the slip frequency $f_S$ to the minimum of the detected motor speeds $f_M$(rpm). If the maximum of the motor speeds detected is larger than the inverter frequency $f_{INV}$ thus determined, in spite of the power running operation, the inverter frequency $f_{INV}$ is made higher than the maximum motor rotational frequency in order to avoid the occurrence of the event that the slip frequency becomes negative and the motors are placed in the electric braking mode. Similarly, in the electric braking operation, the situation should be avoided in which the motors are placed in the power running mode.

A second problem arises in the case where induction motors are parallel-connected as described above. A readhesion phenomenon is observed in which, when slippage (loss of traction) of the wheels coupled to the induction motors occurs (hereinafter referred to as "skidding"), the skidding frequency of the skidding shaft is decreased so that the motor current and the torque are decreased. However, in the case where the slip frequency $f_S$ is corrected so that the motor current is held constant as was described before, control is so made that the slip frequency $f_S$ is increased thereby to prevent the decrease of the motor current. Therefore, the other shafts may also be caused to skid. In order to prevent this difficulty, a readhesion control operation is carried out in which, when the skidding occurs, the skidding is detected by utilizing the variation rate $df_M/dt$ of the output signal of the rotational frequency detector provided at the shaft of each induction motor. Here $f_M$ is the rotational frequency, and t is the time. The result of the readhesion control is to decrease the current instruction value.

FIG. 3 shows another example of the conventional electric vehicle control system which is to drive not only parallel-connected induction motors on its own vehicle (hereinafter referred to as "a first vehicle" or master vehicle) but also parallel-connected induction motors on a second vehicle called a slave vehicle. One reason for the simultaneous control is to efficiently utilize the inverter 5. In FIG. 3, parts corresponding functionally to those already described with reference to FIGS. 1 and 2 are therefore designated by the same reference numerals. Further in FIG. 3, rotational frequency detectors 7c and 7d are provided for induction motors 6c and 6d, respectively, on the slave vehicle. In the conventional system, it is necessary to transmit the output signals of the rotational frequency detectors 7c and 7d provided respectively for the induction motors 6c and 6d on the slave vehicle to the master vehicle.

The inverter may be more efficiently utilized by increasing the number of parallel-connected induction motors. In this case, it is also necessary to simultaneously control the induction motors not only on the master vehicle with the controller but also on the additional slave vehicle. The vehicle with the controller will be called the master vehicle and the vehicle without the controller that is controlled by the master vehicle will be called the slave. Transmission between vehicles may be difficult if not impossible because of noise and the power source arrangement. Thus there also may be great difficulty when vehicles having greatly different wheel diameter are connected together.

SUMMARY OF THE INVENTION

An object of the invention is to eliminate the above-described difficulties.

More specifically, an object of the invention is to detect the wheel diameter difference between the vehicles without using the speed detectors.

A further object of the invention is to provide an electric vehicle control system in which the skidding of the shaft of the induction motor is detected without detecting the rotational frequency thereof, to perform readhesion control as required.

In an electric vehicle protection system according to the invention, a plurality of induction motors are connected in parallel to a variable voltage/variable frequency inverter and driven according to the slip frequency. The plurality of induction motors are divided into a first or master group of induction motors whose speed or rotational frequencies can be detected and a second or slave group of induction motors whose rotational frequencies cannot be detected. The motor current of the first or master group whose speed can be detected is compared with the motor current of the second or slave group whose speed cannot be detected. In one embodiment, the comparison detects the wheel diameter difference between the vehicles, and when the wheel diameter difference is larger than a predetermined allowable value, the protective operation is carried out. Alternatively, readhesion control is effected to prevent skidding.

In the electric rolling stock protecting system of the invention, the motor current of the group of induction motors whose speed cannot be detected is supplied directly from the inverter, and can be detected directly by the current detector, such as a current transformer, built into the inverter.

BRIEF DESCRIPTION OF THE DRAWINGS

FIG. 4 is a circuit diagram of a master and a slave vehicle using the present invention.

FIGS. 5A and 5B are graphs illustrating the effects of differing wheel diameters.

DETAILED DESCRIPTION OF THE PREFERRED EMBODIMENTS

Figure 1:
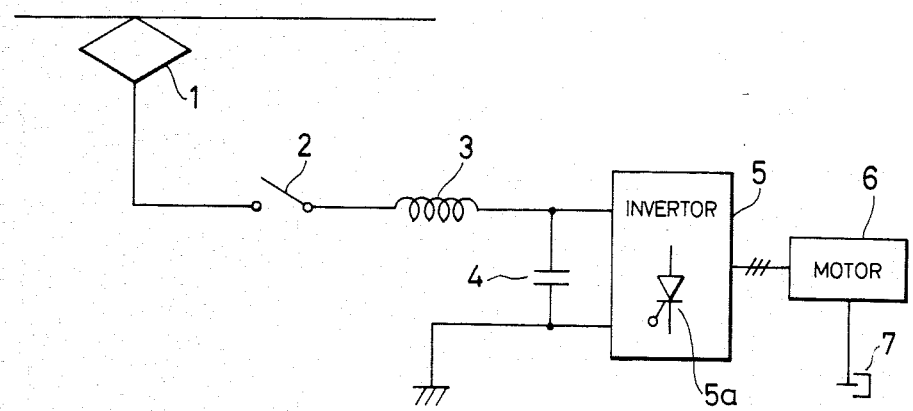
FIG. 1 is a circuit diagram of a prior art control system for a electric vehicle.
Figure 2:
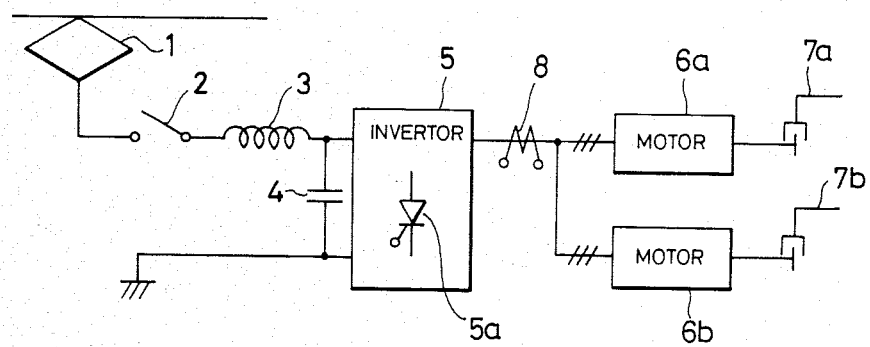
FIGS. 2 and 3 are circuit diagrams of prior art control systems for one or more electric vehicles having multiple motors.
Figure 3:
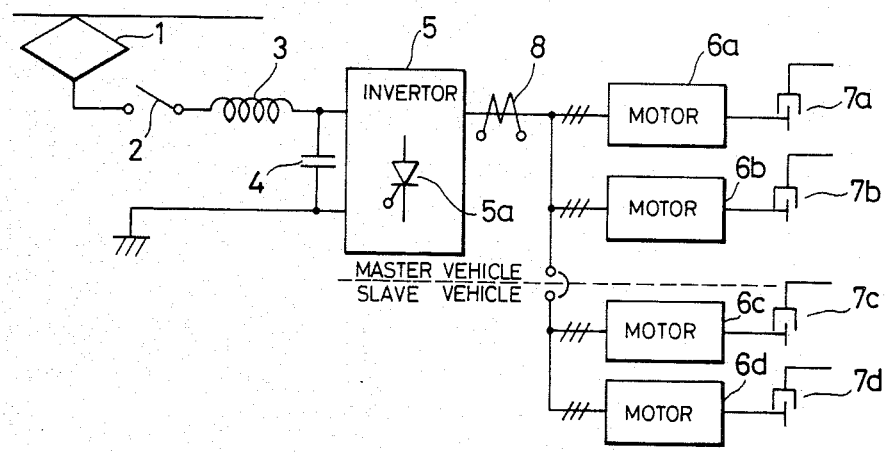

The overall electrical structure of the invention will be illustrated in FIG. 4. Thereafter alternative uses of this structure will be described.

In FIG. 4, induction motors 6a and 6b are located on the same first or master vehicle as the inverter 5 and the other associated components. The motors 6a and 6b have respectively connected speed or rotational frequency detectors 7a and 7b. Induction motors 6c and 6d are mounted on a second or slave vehicle and do not have speed detectors. Thus their speeds cannot be directly detected. A first current detector 8a detects the motor current delivered to the two motors 6a, 6b on the first vehicle. A second current detector 8b, mounted in the first vehicle, detects the current delivered to the two motors 6c and 6d on the second vehicle. The current detectors 8a and 8b detect current and may be current transformers. The remainder of the illustrated elements are the same as those previously described.

FIGS. 5A and 5B are graphs illustrating the dependence of the frequencies in the case where the motor speed of the slave vehicle is higher than that of the master vehicle because of differences in wheel size. In the slave vehicle motor, as the speed increases, the slip frequency $f_S(\text{slave}) = f_{INV} - f_M(\text{slave})$ decreases and therefore the motor current decreases. In this case, the total motor current $I_M(\text{master}) + I_M(\text{slave})$ is maintained constant by the constant control.

The motor current is proportional to the slip frequency. Therefore, $$I_M(\text{master}) = K \times f_S(\text{master}) \quad (4)$$

$$I_M(\text{slave}) = K \times f_S(\text{slave}) \quad (5)$$

where K is a proportionality constant.

From equations (4) and (5), the difference of the two motor currents is given by $$\begin{aligned} I_M(\text{master}) - I_M(\text{slave}) &= Kf_S(\text{master}) - Kf_S(\text{slave}) \\ &= K((f_{INV} - f_M(\text{master})) - (f_{INV} - f_M(\text{slave}))) \\ &= K(f_M(\text{slave}) - f_M(\text{master})). \end{aligned}$$

Therefore, the motor speeds can be related by $$f_M(\text{slave}) = f_M(\text{master}) + \frac{I_M(\text{master}) - I_M(\text{slave})}{K} \quad (7)$$

According to equation (7), the slave vehicle motor speed $f_M(\text{slave})$ can be calculated by detecting the first vehicle motor speed $f_M(\text{master})$, the master vehicle motor current $I_M(\text{master})$, and the slave vehicle motor current $I_M(\text{slave})$.

The motor speed is in inverse proportion to the diameter WD of the wheel to which the motor is connected. Therefore, the difference between the wheel diameters can be calculated by using the following equation:

$$WD(\text{master}) - WD(\text{slave}) = K'\left(\frac{1}{f_M(\text{master})} - \frac{1}{f_M(\text{slave})}\right) \quad (8)$$

If the wheel diameter difference is large, then the motor current unbalance increases with speed. Therefore, in the case of a motor having the large motor current, its torque becomes excessively large, as a result of which the wheel, exceeding the adhesion limit, is caused to skid. In the case of the motor having the smaller motor current, although the power running instruction has been issued, the electric braking mode may be effected in the high speed range where the motor frequency $f_M$ exceeds the inverter frequency.

As is apparent from the above description, if the wheel diameter difference is large, the control becomes impossible. Therefore, if the wheel diameter difference calculated according to the equation (8) is larger than a predetermined limit, then the inverter control device is stopped and the abnormal wheel diameter difference is indicated to the operator.

In the above-described embodiment, the motor currents of the first group of induction motors whose speeds can be detected directly, and of the second group of induction motors whose speeds cannot be detected directly are detected indirectly. However, the same effect can be obtained by employing a method in which the total current and the motor current of the first group of induction motors are detected, or the total current and the motor current of the second group of induction motor are detected and then used for calculation.

As is apparent from the above description, according to the invention, the motor speed is detected through the motor current comparison. Therefore, even if an electric rolling stock with a first group of induction motors whose speed can be detected directly includes a second group of induction motors whose speed cannot be detected directly, the speed of the latter and the wheel diameter difference can be detected indirectly. Accordingly, the electric vehicle can be suitably protected.

Figure 6:
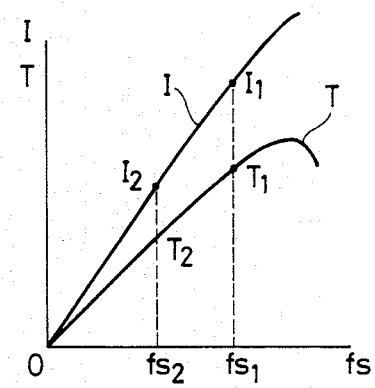
FIG. 6 is a graph illustrating the effect of readhesion.

A solution to the readhesion problem will now be described. FIG. 6 is a graphical representation indicating the dependence of motor current I and produced torque T as a function of the motor slip frequency $f_S$. As is apparent from FIG. 6, when the induction motor is operated at a predetermined frequency $f_{S1}$, the motor current (i.e., the current instruction value) is $I_1$, and the produced torque is $T_1$. However, upon occurrence of skidding, the slip frequency is reduced to $f_{S2}$. Accordingly, the motor current is reduced to $I_2$ while the torque is reduced to $T_2$, so that the skidding shaft tends to operate in a readhesion mode. However, since the motor current is decreased to $I_2$, a control circuit (not shown) operates to increase the slip frequency $f_S$ which is the control parameter for all the parallel-connected induction motors. Thereby the motor current is caused to reach its current instruction value $I_1$. Therefore, the inverter frequency increases, and the torque of all the induction motors increases, as a result of which the skidding may occur frequently.

However, if it is determined that skidding has occurred with the reduction of the motor current to $I_2$, and the current instruction value is then decreased to $I_2$ or less, it is possible to suppress in the control procedure the increase of the slip frequency $f_S$. Therefore, initiation of skidding of the other motors is prevented.

A means for deciding that the skidding has occurred outputs an skidding signal according to the comparison of the motor current value I with the predetermined current value $I_2$.

The fact that the motor current has become smaller than the current instruction value is not sufficient to distinguish the skidding reduction of the motor current from a reduction which is caused by a different element such as a motor voltage limiter. Therefore, in the invention, the current is compared with the current of the induction motor whose rotational frequency can be detected, to determine whether or not the skidding has occurred.

In the embodiment described above, a current detector 8a is provided respectively for the master group of induction motors whose rotational frequencies $f_M$ can be detected directly and another current detector 8b for the slave group of induction motors whose rotational frequencies cannot be detected directly. However, the invention is not so limited. For instance, predetermined calculations can be carried out by using the total current value and one of the parameters of the induction motors whose rotational frequencies can be detected. The total current value and the corresponding parameter of the induction motors whose rotational frequencies cannot be detected are used to obtain the desired current variation.

As is apparent from the above description, the electric vehicle control system of the invention is so designed that, even if the induction motors to be controlled include motors whose rotational frequencies cannot be detected, the readhesion control against skidding can be performed. Therefore, the speed of the vehicles can be stably controlled.

Figure 7:
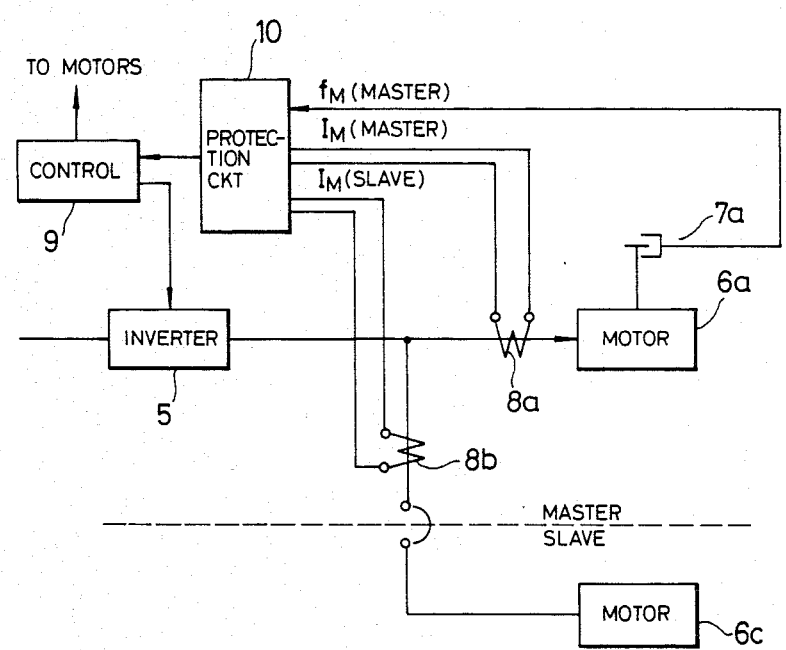
FIG. 7 is a circuit diagram of the invention detailing the control functions.

FIG. 7 illustrates in more detail the control system of the present invention. Only one motor 6a in the master vehicle and one motor 6c in the slave vehicle are shown. A controller 9 controls the thyristor 5a in the inverter 5 and can shut off the current when danger limits are exceeded. The controller 9 also controls the slip frequencies $f_S$ in the motors 6a and 6c. A protection circuit 10 is intended to guard against abnormal conditions.

The protection circuit 10 receives input signals of the motor currents $I_M$(master) and $I_M$(slave) from the motors 6a and 6c on both the master and slave vehicles. The protection circuit 10 also receives a signal of the motor frequency $f_M$(master) from the master motor 6a but does not receive a corresponding signal from the slave vehicle. The protection circuit 10 uses these input values to calculate abnormal conditions, including those for the slave motor 6c whose motor frequency is unavailable. Electronic means for effecting the calculations previously described are well known in the art. Two examples of abnormal conditions were described above, namely, excessive wheel size difference and skidding. If the protection circuit determines that an abnormal condition exists, then it either directly indicates the fact to the controller 9 or notifies the vehicle operator so that the settings on the controller 9 may be changed.

What is claimed is:

1. A system for monitoring one or more electric vehicles which are driven by a plurality of parallel-connected induction motors controlled by a variable voltage/variable frequency inverter, said induction motors being divided into a first group of one or more induction motors and a second group of one or more induction motors, comprising: rotational frequency detecting means for detecting a rotational frequency of said first group of motors;

first current detecting means for detecting a first motor current supplied to said first group of motors;

second current detecting means for detecting a second motor current supplied to said second group of motors; and protection circuit means responsive only to outputs of said rotational frequency detecting means and said first and second current detecting means for determining an operational parameter of said second group of motors indicative of a rotational frequency of said second group of motors.

2. A monitoring system as recited in claim 1, further comprising control means for controlling said first and second groups of motors in response to said determined operational parameter of said second group of motors.

3. A monitoring system as recited in claim 1, wherein said protection circuit means determines a difference in diameters of two sets of wheels attached respectively to said first and second groups of motors.

4. A monitoring system as recited in claim 2, wherein
said protection circuit means determines a difference in diameters of two sets of wheels attached respectively to said first and second groups of motors; and
said control means performs a protective operation in response to said difference in diameters exceeding a predetermined limit.

5. A monitoring system as recited in claim 2, wherein said control means performs slip frequency control of said first and second groups of motors according to said rotational frequency of said first group of motors.

6. A monitoring system as recited in claim 5,
wherein said protection circuit means detects skidding of one or more shafts coupled to said second groups of motors in response to a reduction of said second motor current; and
further comprising means for specifying a current instruction value to effect readhesion control of said second group of motors upon detection of said skidding.

* * * * *